US012705317B2

(12) United States Patent
Schenk et al.

(10) Patent No.: US 12,705,317 B2
(45) Date of Patent: Aug. 11, 2026

(54) SYSTEMS AND METHODS FOR INJECTING CODE FOR TAMPER DETECTION IN A PLAYBACK APPLICATION

(71) Applicants: Verimatrix, Inc., San Diego, CA (US); Verimatrix GmbH, Ismaning (DE); Verimatrix UK, London (GB); Verimatrix OY, Helsinki (FI)

(72) Inventors: Klaus Schenk, Unterföhring (DE); Martin Bergenwall, Helsinki (FI); Neal Michie, London (GB); Johan Lindquist, Merritt Island, FL (US); Zoran Alexov, Ismaning (DE); David Brown, San Diego, CA (US)

(73) Assignees: Verimatrix, Inc., San Diego, CA (US); Verimatrix GmbH, Ismaning (DE); Verimatrix UK, London (GB); Verimatrix OY, Helsinki (FI)

( * ) Notice: Subject to any disclaimer, the term of this patent is extended or adjusted under 35 U.S.C. 154(b) by 259 days.

(21) Appl. No.: 18/714,461

(22) PCT Filed: Nov. 29, 2022

(86) PCT No.: PCT/US2022/080604
§ 371 (c)(1),
(2) Date: May 29, 2024

(87) PCT Pub. No.: WO2023/097340
PCT Pub. Date: Jun. 1, 2023

(65) Prior Publication Data

US 2025/0021629 A1 Jan. 16, 2025

Related U.S. Application Data

(60) Provisional application No. 63/264,653, filed on Nov. 29, 2021.

(51) Int. Cl.
*G06F 21/12* (2013.01)
*G06F 11/30* (2006.01)
(Continued)

(52) U.S. Cl.
CPC ........ *G06F 21/125* (2013.01); *G06F 11/3058* (2013.01); *G06F 21/54* (2013.01);
(Continued)

(58) Field of Classification Search
CPC ...... G06F 21/125; G06F 21/54; G06F 21/566; G06F 21/16; G06F 2221/034; G06F 11/3058
See application file for complete search history.

(56) References Cited

U.S. PATENT DOCUMENTS 10,657,251 B1 5/2020 Malik et al.
11,212,643 B1 * 12/2021 Silver ................. H04L 43/0852
(Continued)

FOREIGN PATENT DOCUMENTS

EP 4441642 A1 10/2024
WO 2023097340 A1 6/2023

OTHER PUBLICATIONS

Cho et al. Mobile application tamper detection scheme using dynamic code injection against repackaging attacks Springer J Supercomput 72, pp. 3629-3645 Jun. 2, 2016 (Year: 2016).*
(Continued)

*Primary Examiner* — David J Pearson
(74) *Attorney, Agent, or Firm* — KPPB LLP

(57) ABSTRACT

An embodiment of the invention describes a method for detecting tampering with copy restrictions on a media playback device that includes identifying locations within playback application executable files on a playback device that contain instructions for application programming interface (API) calls, modifying the API call locations to insert pieces
(Continued)

of tamper detection code, where the pieces of tamper detection code when executed collects monitoring data about characteristics of the playback device and content being played, collecting monitoring data when API calls are performed by the API call locations, generating a confidence level of tampering from the collected monitoring data, and performing a remediation action in response to the confidence level exceeding a predetermined threshold, where the predetermined threshold is set based on types of monitoring data that was collected.

17 Claims, 5 Drawing Sheets

(51) Int. Cl.
*G06F 21/54* (2013.01)
*G06F 21/56* (2013.01)
*G06F 21/16* (2013.01)

(52) U.S. Cl.
CPC ............ *G06F 21/566* (2013.01); *G06F 21/16* (2013.01); *G06F 2221/034* (2013.01)

(56) References Cited

U.S. PATENT DOCUMENTS 11,720,686 B1 * 8/2023 Cross ...................... G06F 9/455 726/25
2007/0033419 A1 2/2007 Kocher et al.
2011/0255690 A1 10/2011 Kocher et al.
2012/0036585 A1 * 2/2012 Risan .................... H04L 63/102 726/30
2012/0042134 A1 * 2/2012 Risan ...................... G06F 21/10 711/E12.001
2014/0181896 A1 * 6/2014 Yablokov ................ G06F 21/53 726/1
2015/0135298 A1 * 5/2015 Robison ................ H04W 4/029 726/19
2015/0220707 A1 * 8/2015 Kline ...................... G06F 21/53 726/30
2016/0378447 A1 * 12/2016 Nandakumar .......... G06F 21/54 717/108
2017/0054760 A1 2/2017 Barton et al.
2017/0220798 A1 * 8/2017 Madou .................. G06F 21/552
2018/0018675 A1 * 1/2018 Ekambaram ......... G06Q 30/018
2018/0082045 A1 * 3/2018 Koukine ............. G06F 21/6218
2020/0065341 A1 2/2020 Reshadi et al.
2021/0200864 A1 7/2021 Rudnik
2021/0240801 A1 8/2021 Budni et al.
2023/0128866 A1 * 4/2023 Bhattacharyya .......... G06F 8/60 717/136
2023/0362651 A1 * 11/2023 Lie ........................ H04W 12/30

OTHER PUBLICATIONS

Extended European Search Report for European Application No. 22899594.0, Search completed Aug. 8, 2025, Mailed Aug. 26, 2025, 08 Pgs.
International Preliminary Report on Patentability for International Application PCT/US2022/080604, Report issued May 2, 2024, Mailed on Jun. 13, 2024, 8 Pgs.
International Search Report and Written Opinion for International Application No. PCT/US2022/080604, Search completed Feb. 8, 2023, Mailed Mar. 8, 2023, 13 Pgs.

* cited by examiner

SYSTEMS AND METHODS FOR INJECTING CODE FOR TAMPER DETECTION IN A PLAYBACK APPLICATION

CROSS-REFERENCE TO RELATED APPLICATIONS

This application is a national stage of PCT Patent Application No. PCT/US2022/080604 entitled "Systems and Methods for Injecting Code for Tamper Detection in a Playback Application" to Schenk et al., filed Nov. 29, 2022, which claims the benefit of and priority under 35 U.S.C. § 119(e) to U.S. Provisional Patent Application No. 63/264,653, entitled "Systems and Methods for Injecting Code for Tamper Detection in a Playback Application" to Schenk et al., filed Nov. 29, 2021, which are incorporated herein by reference in their entirety for all purposes.

FIELD OF THE INVENTION

The present invention generally relates to streaming video playback and more specifically to systems and methods for detecting and responding to tampering and other attacks on playback devices, as well as protecting the clients and client software.

DETAILED DESCRIPTION OF THE DRAWINGS

Turning now to the drawings, systems and methods for injecting code for tamper detection in a playback application in accordance with embodiments of the invention are illustrated. The current state of video streaming over the internet entices many forms of unauthorized access or copying of content (e.g., pirating). For example, exploits can include man-in-the-middle attacks, stealing decryption keys, and other attempts to compromise the content or DRM (digital rights management) protecting the content. Many streaming playback applications attempt to deter attacks by static protection measures.

Several embodiments of the invention include systems and methods for inserting new code into a given streaming application. As will be described further below, the new code can include tamper detection and/or mitigation mechanisms to detect attacks and other compromises to system functions and video content. The system can also provide protection of the client code. This protection is source of monitoring events of attempts to overcome the protection.

System Architecture

Figure 1:
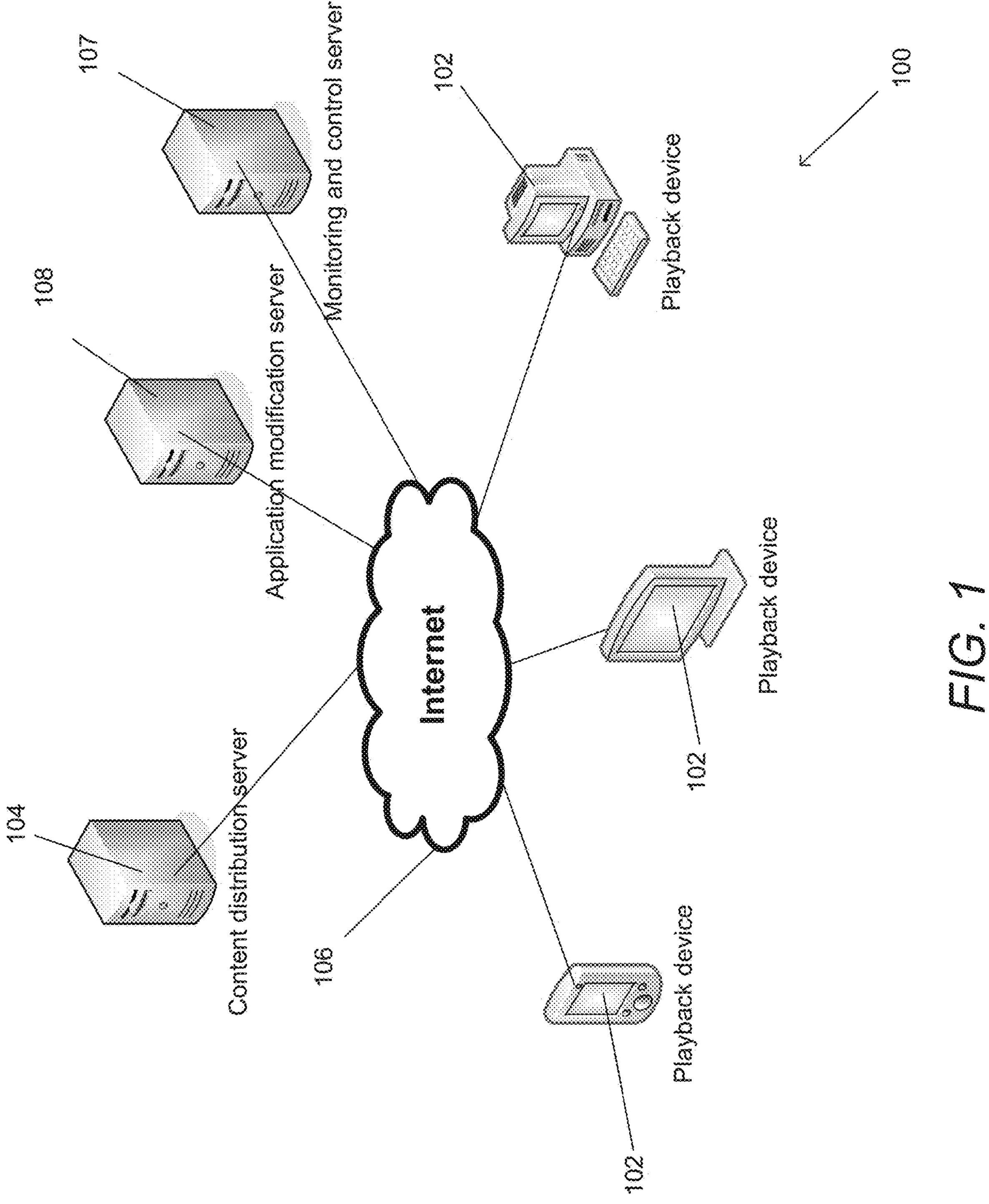
FIG. 1 is a system diagram of a video distribution system in accordance with an embodiment of the invention.

Video can be streamed or transmitted to playback devices via a network such as the Internet. A video distribution system in accordance with an embodiment of the invention is illustrated in FIG. 1. The system 100 includes a number of different playback devices 102 connected to a content distribution server 104 over the Internet 106. The playback devices 102 can include playback applications configured to receive and decode encoded video from the content distribution server 104. An application modification server 108, configured to modify playback applications according to processes such as those discussed further below, can receive playback application code from one or more playback devices 102 or other devices over the Internet 106. Although video transmitted to playback devices via the internet is mentioned above, video can be transmitted to playback devices in any manner as appropriate to specific applications in accordance with many embodiments of the invention, including over a local access network (LAN).

Figure 2A:
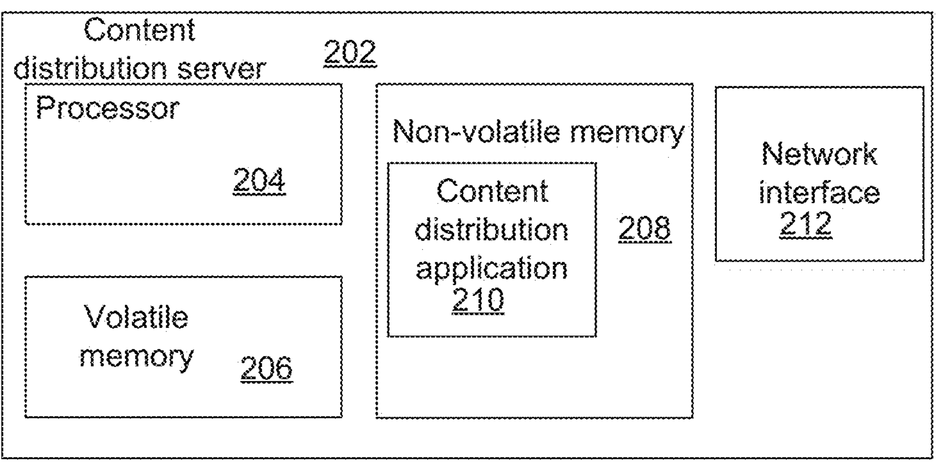
FIG. 2A illustrates a source encoder in accordance with an embodiment of the invention.

A content distribution server in accordance with many embodiments of the invention can load a content distribution application as machine readable instructions from memory or other storage. A content distribution server in accordance with an embodiment of the invention is illustrated in FIG. 2A. The content distribution server 202 includes a processor 204, volatile memory 206 and non-volatile memory 208 that includes a content distribution application 210. In the illustrated embodiment, the non-volatile memory 208 is a machine-readable media that can be utilized to store the machine-readable instructions that configure the processor 204. The non-volatile memory 208 contains a content distribution application 210, which can be utilized to configure the processor 204 to provide video content to one or more playback devices using network interface 212.

Figure 2B:
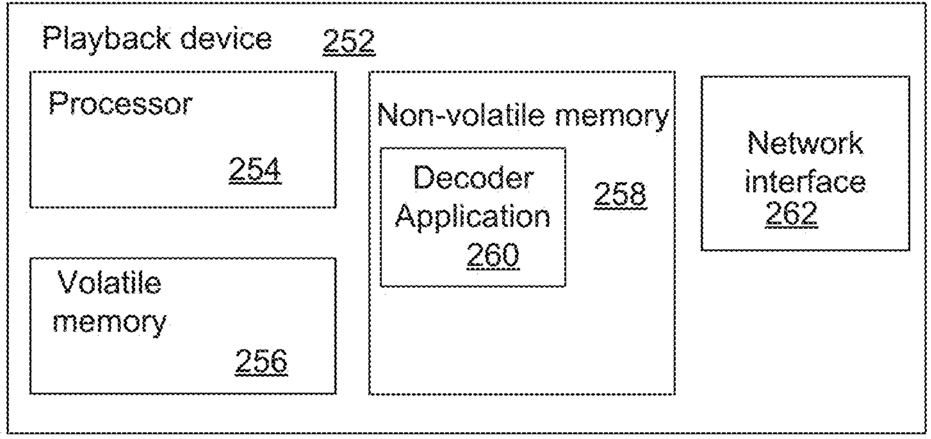
FIG. 2B illustrates a playback device in accordance with an embodiment of the invention.

Playback devices in accordance with many embodiments of the invention can load a playback application as machine readable instructions from memory. A playback device in accordance with an embodiment of the invention is illustrated in FIG. 2B. The playback device 252 includes a processor 254, volatile memory 256 and non-volatile memory 258 that includes a playback application 260. In the illustrated embodiment, the non-volatile memory 258 is a machine-readable media that can be utilized to store the machine-readable instructions that configure the processor 254. Here, the non-volatile memory 258 contains the instructions of a playback application 260, which can be utilized to configure the processor 254 to decode video. In many embodiments, a playback application can be loaded from any kind of memory or storage device including volatile memory in accordance with many embodiments of the invention.

Figure 2C:
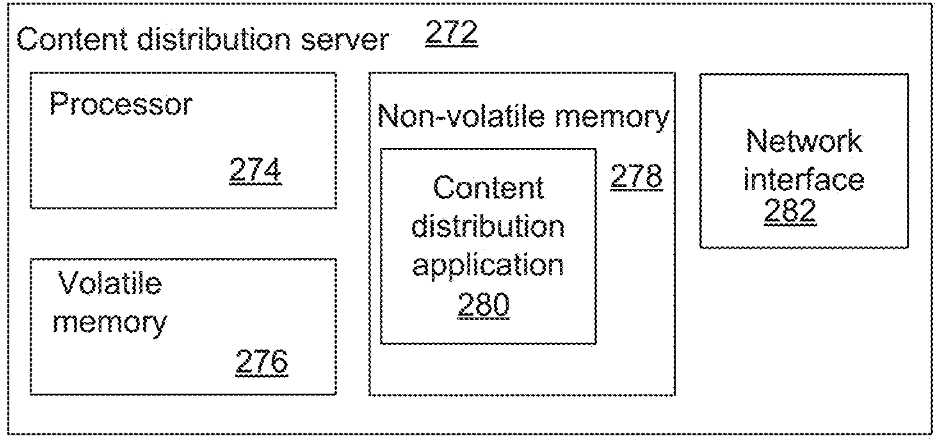
FIG. 2C illustrates a content distribution server in accordance with an embodiment of the invention.

Application modification servers in accordance with many embodiments of the invention can load an application modification application as machine readable instructions from memory. An application modification server in accordance with an embodiment of the invention is illustrated in FIG. 2C. The application modification server 272 includes a processor 274, volatile memory 276 and non-volatile memory 278 that includes a content distribution application 280. In the illustrated embodiment, the non-volatile memory 278 is a machine-readable media that is utilized to store the machine-readable instructions that configure the processor 274. Here, the non-volatile memory 278 contains the instructions of an application modification application 280, which can be utilized to configure the processor 274 to modify a playback application. In many embodiments, an application modification application can be loaded from any kind of memory or storage device including volatile memory in accordance with many embodiments of the invention. In several embodiments of the invention, an application modification server is implemented as a web server that can provide a user device with a web page that includes a form. Code that makes up a playback application can be entered into the form and returned to the application modification server.

Additional embodiments of the invention can include a monitoring and control server 107 that can receive monitoring data from playback devices, provide command profiles to playback devices, and/or control countermeasures performed on playback devices. In some embodiments, a monitoring and control server can be the same server as the application modification server.

Although a video distribution system is described above with respect to a specific source encoder, content distribution server and playback devices, any of a variety of encoding, transmitting or decoding systems can be utilized in the encoding, decoding and transmission of video as appropriate to specific applications in accordance with many embodiments of the invention. Assignment of importance values in accordance with embodiments of the invention are discussed below.

Code Injection

Functionality for tamper detection in accordance with many embodiments of the invention can be embedded into a target playback application using no-code approaches. No-code approaches can include methodologies that use automated modification of application code to insert pre-constructed tamper detection without needing access to the original source code of the application or a programmer to develop new code that is specific for the integration. As will be discussed below, some techniques may utilize APIs without needing to decompile binary, while other techniques decompile at least a portion of the binary.

Some code injection techniques in accordance with embodiments of the invention can utilize information concerning which APIs (application programming interface) are utilized in target playback applications and how they may be modified in order to insert tamper detection functionality. APIs (for example, Android SDK) are typically public and well known. Their schema, e.g., definitions including header files and structure, are often published for widespread usage.

An application modification application designed for code injection can be designed to recognize whether certain APIs are incorporated into a target playback application. Appropriate APIs can be determined in advance, by analyzing available APIs for the capability to adopt monitoring and/or control features that would be useful in tamper detection and have identifiable injection points where code can be inserted without need to decompile the application.

Typically, when APIs are used in an application, the calling locations are stable across subsequent versions of the application. Therefore, once the locations are found, they can be reused to modify subsequent versions of the same application. In many embodiments of the invention, the API locations are modified by statically linking a tamper detection library in the same location so that the tamper detection library is called instead of the original API call. When the tamper detection library is called the original API call is executed, and also the injected code of the tamper detection library. The injected code can be any of the types of detection mechanisms as discussed further below. In several embodiments, the injected code is linked to an init function to ensure that it is executed at the beginning.

In some embodiments of the invention, binary of a playback application can be provided to an application modification application. The provided binary can be decompiled for insertion of modified code. For example, a java player utilizing a javascript wrapper can be decompiled into byte code, an intermediate representation that is machine independent.

In several embodiments of the invention, insertion can include performing a functional static analysis on the source tree to determine how different components interact. For example, with java, a signature can be determined from a function and class. Code paths can be created by adding new code before or after a method. Code paths can be created and/or modified by adding new code before, after, inside a method. Function return values and parameters can also be intercepted.

In still further embodiments of the invention, insertion points can be identified by analyzing bytewise sequences in the code.

Additional information can be useful for identifying locations where code may be modified, such as the source code when an application is open source and details of particular APIs from the developers. Heuristics can be used to whether an application can be modified. There are some deterministic ways to find where coded can be added (e.g., if a debugger is attached to a binary, if binary has been modified, if tools to debug attached to APIs). Profiles of potential injection points can be built and saved into libraries.

The modified application code can be recompiled into a new binary that, when executed, functions like the original playback application but with the enhancements for detection added with the modified code.

In some embodiments, the code injected into the applications running on the playback devices can allow reporting back of monitoring data to a monitoring and control server and receiving control data back from this server. In other embodiments, a tamper detection agent executing by inserted code receives the monitoring data and determines whether to provide a response (e.g., by limited or denying playback) as will be discussed further below.

Data Sources

As mentioned above, injected code (e.g., linked to API calls) can collect monitoring data that may provide some evidence indicative of tampering. One or more pieces of monitoring data can be combined to generate a quantifiable estimate of suspicion that tampering is present, referred to as a confidence level. Listed below are some types of monitoring data that may be collected in accordance with embodiments of the invention. Some of all of these types of data may be collected, and one skilled in the art will recognize that additional types of data may be suitable as appropriate for a particular application. Different types of data may be retrieved from different sources.

These types of data may be obtained from an operating system (e.g., Android):

- Cellular phone network status (e.g., is the phone or mobile device connected to a cellular network and what type, 4G LTE, 5G UWB, etc.).
- GPS location (e.g., is the phone or mobile device in one place for a long period of time). Being stationary or lack of movement can raise the level of tampering.
- IP network information (identification and geolocation, VPN detection if a VPN is in use). Use of VPN can raise the level of tampering.
- Battery status.
- Temperature sensor. A relatively constant temperature over time can indicate a controlled environment and raise the level of tampering.

Ambient lighting sensor (e.g., is the environmental light constant indicating it is a controlled environment). A relatively constant light intensity can raise the level of tampering.

Acceleration sensor(s)/accelerometer(s). Being stationary or lack of movement can raise the level of tampering.

List of installed applications or scan for running applications—are there known malware applications. Presence of malware can raise the level of tampering.

HDCP information blacklisted HDCP devices (e.g., for an Android TV or set top box connected to a device with a blacklisted HDCP ID can raise the level of tampering.)

List of connected Bluetooth devices.

These types of data may be obtained as injected sensors (e.g., by a code injection method as described further above):

Debugging detection—can be determined directly from flow of application, if the portions of the playback application have been decompiled and recompiled it can raise the level of tampering.

Root detection—locate specific bits and/or files that indicate the operating system has been rooted, which can raise the level of tampering.

Virtual machine detection—locate specific bits and/or files that indicate the device is running as a virtual machine, which can raise the level of tampering.

Application integrity—build a checksum of certain areas of file(s) or memory, compare to a previous hash. Not matching a previous hash can raise the level of tampering.

These types of data may be obtained from the API of the playback application (sometimes part of the OS):

How long the content is being played.

Is fast forward or rewind (trick play) being used.

How much content is played per day.

Overlay detection—is screen copying used.

While some specific types of monitoring data are described above, one skilled in the art will recognize that other types may be utilized as appropriate in accordance with embodiments of the invention.

Tamper Detection Agent (Command Processor)

Techniques to modify a playback application such as those discussed above can add detection capabilities. Some embodiments of the invention include incorporating a tamper detection agent into the playback application via modified code. The tamper detection agent can act as a mini virtual machine (VM) to give more offline character (e.g., independent of a head-end) for flexibility in monitoring and detection. In several embodiments of the invention, the tamper detection agent can be a main thread of a tamper detection application that is spawned by tamper detection code inserted into a playback application. Other portions of inserted tamper detection code can be linked to APIs to collect data going into and/or out of the APIs. The tamper detection agent can receive the collected data from the APIs and determine a confidence level of whether tampering is occurring on the playback device that compromises restrictions to copying the content being played. As will be discussed further below, it can also decide if a response is appropriate based on the confidence level.

In some embodiments of the invention, the tamper detection agent has an internet connection. Using the internet connection, it can download command profiles for dynamic configuration, allowing the playback device to adopt new configurations in detection and response. This can add adaptability, for example, to detect minor changes in vector of an attack that does not exactly match one of the existing detection rules. In such embodiments, the tamper detection agent can be referred to as a command processor. In several embodiments, it can communicate with a server (for example a monitoring and control server) to provide monitoring data and receive instructions on how to respond to a detected vulnerability or confidence level of tampering, e.g., disabling playback, receiving an overlay watermark to apply to the content, reducing quality, etc., as discussed further below. In further embodiments, it can record the timing of events, attempt remediation steps, and/or control the power state of the device.

Some conditions to be monitored can include whether a debugger (e.g., Frida) is attached to the application, whether bytecode or binary of the application is changed, environmental conditions (e.g., whether the application is installed at the default path, whether the application is operating properly, whether the application is running on a rooted device, etc.), and whether an HDCP device is blacklisted. Detected scenarios can also include multiple conditions around a counter of events and timing, (e.g., player is restarted many times on a rooted device with blacklisted HDCP device, content is played back multiple times with a debugger attached, etc.).

In various embodiments of the invention, any of a variety of rules may be utilized to generate a confidence level that indicates a level of suspicion that there is tampering of the device. Some simple rules can include a high level of confidence (e.g., responding by disabling playback of content) if it is detected that the device is emulated or rooted, or the device is using a VPN.

More complex rules can include multiple detected conditions of those described further above. For example, conditions can include 1) if a device is not moving (using GPS and/or accelerometer), 2) is connected to constant external power, 3) has stable lighting conditions (using ambient light sensor), and/or 4) the piece of content(s) is played back from beginning to end. If two of the conditions are present can indicate a low level of confidence of tampering, while three or more conditions present can indicate a high confidence level of tampering. Different remediation can be applied to different confidence levels of tampering.

In additional embodiments of the invention, a tamper detection agent can create detection signatures that can be used to identify similar attacks. Attacks of known malware can be simulated on the playback device and the execution observed to generate "fingerprints." The fingerprints can be used to create detection signatures that can aid in evaluating future suspected attacks by matching some aspects of the code execution and/or pattern of accessing software/hardware components by suspected malware code. Furthermore, fingerprints can be provided to a machine learning model as training data to train the model for identification of similar attacks.

Although a number of detection conditions are discussed above, one skilled in the art will recognize that any of a variety may be utilized in accordance with embodiments of the invention.

Content Tracking Verification as Evidence of Tampering

In some embodiments of the invention, a tamper detection agent can direct data to be inserted into the content to generate additional data that can be collected in a verification procedure. This additional verification data can be used in the determination of a level of confidence in or suspicion of tampering. Countermeasures in embodiments of the invention can include embedding one or more tracing mechanisms into the content that is played back. For example, metadata and/or an imperceptible watermark can be added to content when tampering or a compromise is detected. These metadata and/or watermark can indicate one or more characteristics of playback (e.g., ID of the device, ID of the user, date/time of playback, etc.).

In several embodiments of the invention, the additional data is in the form of a perceptible or imperceptible watermark applied to the video content. The tamper detection agent of a suspected playback device to be tracked can provide an identifying watermark to be inserted while the content is played back. One skilled in the art will recognize that any of a variety of perceptible or imperceptible watermarks may be appropriate, e.g., a unique alphanumeric code identifying the playback device, a temporal sequence of illuminated pixels or shapes, etc.). For example, a serial number or MAC address can be imperceptibly embedded to one or more frames of video in a way that is recoverable. Alternatively, the content can be deliberately reduced in quality, e.g., by blurring or lowering resolution of part or whole of one or more frames of video, in a pattern that is recognizable by an entity extracting the mark but not obvious to a user of the playback device. Quality can be reduced, for example, by making every Xth bit black (where X is an integer), combining every 4 pixels in a square within a frame to one color to reduce resolution, etc.

If the watermarked content is later found in a channel where it is not expected or permitted (e.g., peer-to-peer networks, known servers of piracy, unauthorized/unofficial sources, etc.), then the confidence level of tampering can be elevated for the playback device that applied the watermark.

Mitigation—Remediation

As discussed above, a modified playback application in accordance with embodiments of the invention may detect a compromise or suspicion of a compromise. It is often desirable to make any remediation efforts have less impact on legitimate users. For example, it would not be an acceptable experience and scenario for a legitimate user watching content to be interrupted by having the content shut off due to a false detection. Therefore, it can be useful to have levels of verification to reduce false positives and utilize countermeasures that are commensurate with the level of risk and confidence of a vulnerability. If the confidence level (measuring suspicion) of tampering elevates or becomes greater, the severity of the countermeasure(s) to be applied can escalate accordingly. The tamper detection agent (e.g., command processor mini VM) can also be provided with instructions to take countermeasures automatically under certain conditions (e.g., if connection to the servers is lost).

Systems in accordance with several embodiments of the invention can utilize any of a variety of countermeasures when a compromise is detected. Moreover, the degree of countermeasure can increase with the severity and/or likelihood of the compromise. For example, various embodiments of the invention can include limiting the capabilities of playback of content to different degrees (e.g., temporarily for a short time period, for content having certain characteristics such as particular owner or distributor) or limiting the quality of playback, for example to certain resolutions (e.g., 1440p, 1080p HD, etc.) or to certain framerates (e.g., 30 frames per second, 24 fps, etc.). Disabling playback can be achieved in various ways, such as by preventing one or more modules from executing (e.g., decoder) or by preventing necessary cryptographic functions (e.g., removing or expiring decryption keys), or by overlaying the video with patterns or visible messages.

A response in further embodiments of the invention can include simply observing by the tamper detection agent and not taking any affirmative action. The playback device via the tamper detection agent can provide some or all of the detection information to the head-end or other server to decide what action to take. Some embodiments include artificial intelligence or machine learning at the head-end to adapt to new situations and incorporate new information in decision-making.

More comprehensive countermeasures can include blacklisting the device. For example, when a level of suspicion of tampering is very high, some identification of the device (a device identifier, serial number, MAC address, etc.) can be provided to a content distribution server or other server that maintains a blacklist. Further requests for content from a device matching an identifier on the blacklist can be denied or ignored. In some embodiments of the invention, blacklisting can be an appropriate response to the most egregious detection conditions indicating tampering, e.g., known malware applications are detected, the playback device is connected to a blacklisted HDCP ID device, etc.).

Although a number of countermeasures are discussed above, one skilled in the art will recognize that any of a variety of countermeasures may be utilized in accordance with embodiments of the invention.

Processes for Code Injection

Figure 3:
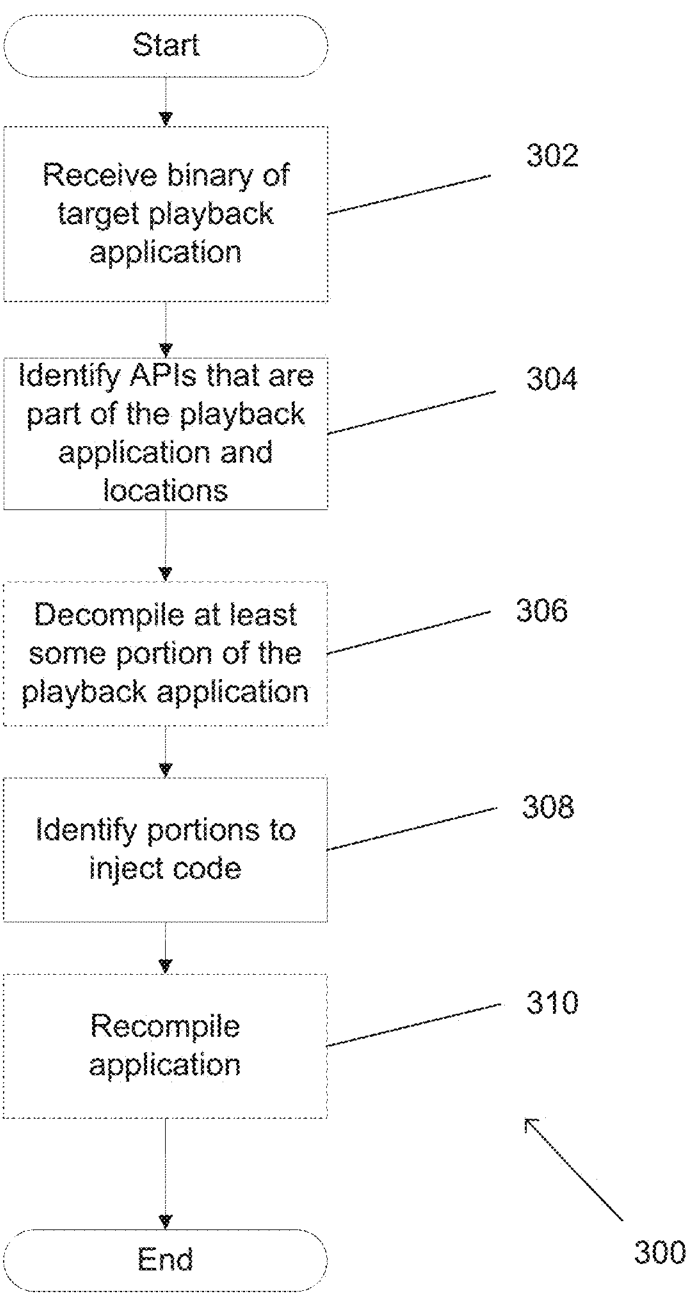
FIG. 3 illustrates a process for code injection in accordance with some embodiments of the invention.

A process for code injection of tamper detection capabilities in accordance with embodiments of the invention is illustrated in FIG. 3. The process 300 includes receiving (302) code of a playback application in binary format. The code can be received in a variety of ways in accordance with different embodiments of the invention. In some embodiments, a web browser interface can be used to capture the code. A user can copy and paste the code into a user interface rendered as a web page (e.g., a form) on the display of a user device. After the code is entered, the web browser can send the code to a server for further processing.

In other embodiments of the invention, the code can be transmitted to a server using other types of file transfer mechanisms (e.g., FTP).

The process includes identifying (304) one or more APIs (application programming interface) that are incorporated into the playback application. In some embodiments, the playback application can be decompiled for modification (306). In other embodiments, the API locations can be modified without decompiling.

The process includes identifying (308) locations in the code where supplemental code can be inserted. The playback application is then recompiled (310).

Although a specific process is discussed above, one skilled in the art will recognize that any of a variety of processes may be utilized in accordance with embodiments of the invention.

Processes for Tamper Detection using a Tamper Detection Agent

Figure 4:
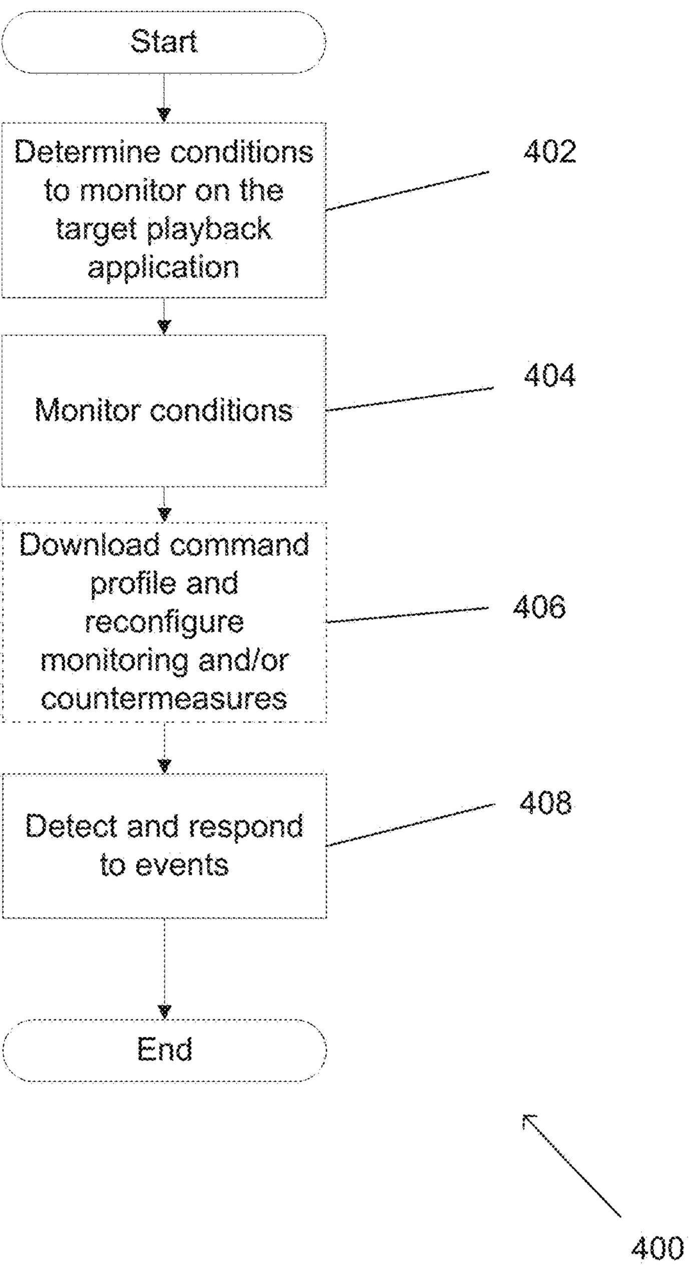
FIG. 4 illustrates a process for detection using a tamper detection agent on a playback device in accordance with embodiments of the invention.

A process for tamper detection in accordance with embodiments of the invention is illustrated in FIG. 4. The process 400 includes executing a tamper detection agent to determine (402) conditions to monitor on the target playback application, such as one that is inserted by modified code according to processes such as those described above.

The process includes monitoring (404) tamper conditions by collecting monitoring data. New command profiles can be downloaded (406) to reconfigure monitoring and/or countermeasures in response to certain events or scenarios that are unexpected. The process can include receiving a new command profile and reconfiguring one or more detection and/or mitigation algorithms using the command profile.

The process includes detecting (408) and responding to events that may indicate tamper conditions. In several embodiments of the invention, detection includes generating a confidence level that tampering is present on the playback device. The confidence level can be determined from one or more pieces of monitoring data as discussed further above.

As discussed further above, different mechanisms for remediation may be available in accordance with embodiments of the invention. Furthermore, lower impact measures may be taken when there is a low level of suspicion of tampering, while higher impact measures may be taken when there is a high level of suspicion of tampering. As the level of suspicion escalates, higher impact measures may be implemented in place of low impact measures. Correspondingly, as level of suspicion deescalates, lower impact measures may be implemented while high impact measures are removed.

Although a specific process is discussed above, one skilled in the art will recognize that any of a variety of processes may be utilized in accordance with embodiments of the invention.

Processes for Responding to Detected Tampering

Figure 5:
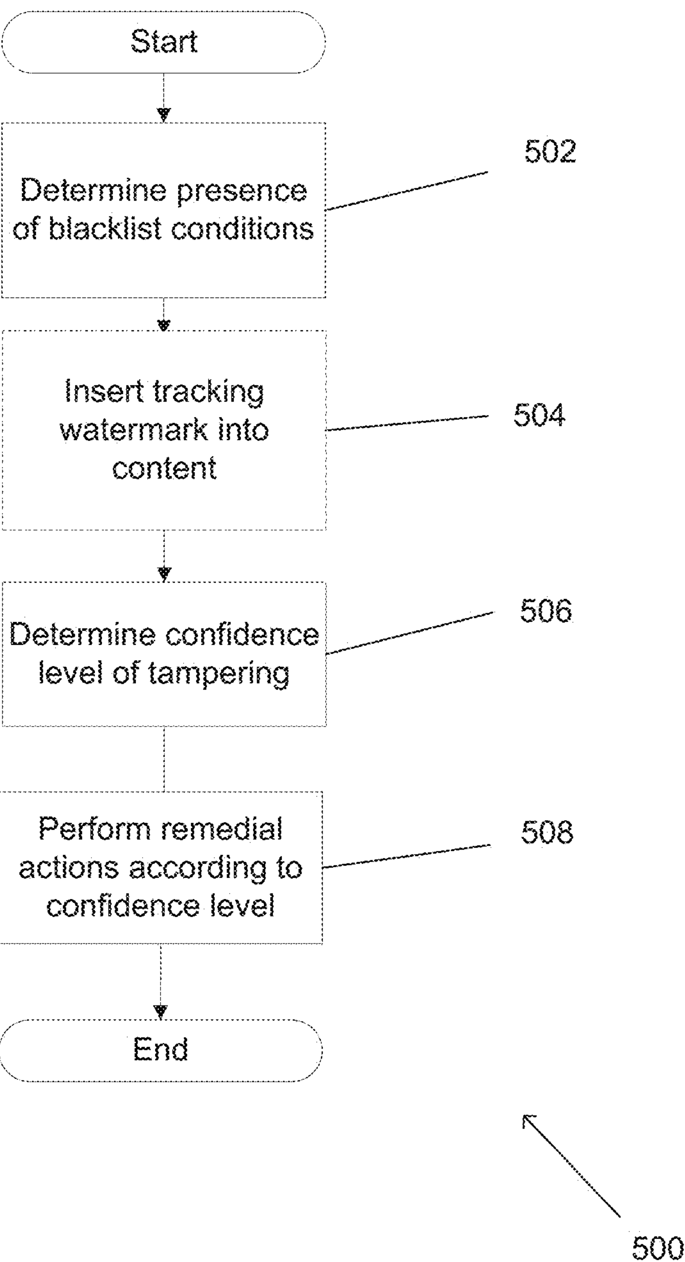
FIG. 5 illustrates a process for determining a confidence level of tampering and an appropriate response in accordance with embodiments of the invention.

As discussed above, suspected tampering can be detected by a confidence level generated from pieces of monitoring data and then responded to. A process for determining a confidence level and appropriate response is illustrated in FIG. 5.

The process 500 includes determining (502) presence of blacklist conditions. As mentioned further above, some conditions indicated in monitoring data may be so severe (e.g., detected malware or rooting of the device) that the confidence level is very high and the appropriate response may be to blacklist the device.

As mentioned further above, a tracking watermark can be inserted (504) into the content, for example, when the monitoring data indicates some likelihood of tampering that is low and a verification procedure should be implemented to determine if unauthorized use or copying of the content can be found elsewhere. If the marked content is found being used in an unauthorized manner, the confidence level can be raised and/or the tracked device blacklisted.

A confidence level of tampering is determined (506) from monitoring data (e.g., characteristics of the playback device and/or playback of content extracted by API calls). Different types of monitoring data that can be used are discussed further above, which can be sourced from the operating system, playback application, or other data sources.

If the confidence level that there is tampering is above a predetermined threshold, remedial actions can be performed (508). As discussed further above, remedial actions can include restricting playback in some way, lowering the visual quality of content, inserting a watermark, blacklisting the device, and/or other appropriate actions.

Although a specific process is discussed above, one skilled in the art will recognize that any of a variety of processes may be utilized in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method for detecting tampering with copy restrictions on a media playback device, the method comprising:

identifying a plurality of locations within playback application executable files on a playback device that contain instructions for application programming interface (API) calls;

modifying the API call locations to insert pieces of tamper detection code, where the pieces of tamper detection code when executed collects monitoring data about characteristics of the playback device and content being played;

collecting monitoring data when API calls are performed by the API call locations;

generating a confidence level of tampering from the collected monitoring data; and performing a remediation action in response to the confidence level exceeding a predetermined threshold, where the predetermined threshold is set based on types of monitoring data that was collected.

2. The method of claim 1, further comprising:

receiving a new version of the playback application from a developer; and locating API call locations within the new version of the playback application and making the same modifications to insert the tamper detection code in the API call locations.

3. The method of claim 1, wherein the monitoring data includes GPS location, accelerometer information, and ambient light sensor information of the playback device retrieved from an operating system of the playback device.

4. The method of claim 1, wherein the monitoring data includes cellular phone status, temperature sensor, and battery status of the playback device retrieved from an operating system of the playback device.

5. The method of claim 1, wherein the monitoring data includes a list of installed applications, a list of running applications, and HDCP information of devices connected to the playback device.

6. The method of claim 1, wherein the monitoring data includes debugging information, root detection, and virtual machine detection.

7. The method of claim 1, wherein the monitoring data includes length of playback of content, trick play usage, frequency of playback, and overlay detection of content played back on the playback device.

8. The method of claim 1, wherein at least one of the pieces of tamper detection code executes as a main thread that coordinates the collection of monitoring data from other data sources.

9. The method of claim 8, where the main thread generates the confidence level and communicates with a server to receive instructions on how to respond to a particular confidence level of tampering.

10. The method of claim 8, wherein the main thread simulates malware on the playback device, generates fingerprints of the executed malware, and creates detection signatures from the fingerprints for future detection of suspected attacks.

11. The method of claim 1, wherein the remediation action includes inserting a watermark onto the content and receiving information confirming detection of the watermark on a different device.

12. The method of claim 11, further comprising disabling playback on the playback device.

13. The method of claim 1, wherein the remediation action reduces visual quality of the content being played.

14. The method of claim 1, wherein the remediation action prevents playback of content when the monitoring data indicates that the playback device meets a condition of: having an operating system that is rooted, communicating using a virtual private network (VPN), or running by emulation.

15. The method of claim 1, wherein the predetermined threshold is the playback device meeting at least three of the conditions of: not moving, connected to external power, having stable ambient lighting conditions, and a piece of content is played back from beginning to end.

16. The method of claim 1, further comprising:

receiving a command profile from a monitoring and control server that provides instructions for determining a confidence level of tampering from the collected monitoring data; and modifying the performance of the determination of the confidence level according to the command profile.

17. The method of claim 1, further comprising:

providing at least some of the monitoring data to a monitoring and control server; and receiving identification of the remediation action to perform from the monitoring and control server.

* * * * *